United States Patent
George et al.

(10) Patent No.: US 12,443,845 B2
(45) Date of Patent: Oct. 14, 2025

(54) SYSTEM AND METHOD FOR ONLINE TIME-SERIES FORECASTING USING SPIKING RESERVOIR

(71) Applicant: Tata Consultancy Services Limited, Mumbai (IN)

(72) Inventors: Arun George, Bangalore (IN); Dighanchal Banerjee, Kolkata (IN); Sounak Dey, Kolkata (IN); Arijit Mukherjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 556 days.

(21) Appl. No.: 18/070,858

(22) Filed: Nov. 29, 2022

(65) Prior Publication Data
US 2023/0229911 A1    Jul. 20, 2023

(30) Foreign Application Priority Data
Jan. 14, 2022   (IN) .............................. 202221002396

(51) Int. Cl.
G06N 3/08   (2023.01)
(52) U.S. Cl.
CPC ..................... G06N 3/08 (2013.01)
(58) Field of Classification Search
CPC ..................................................... G06N 3/08
See application file for complete search history.

(56) References Cited

U.S. PATENT DOCUMENTS 9,020,870 B1 *  4/2015  Daily ........................ B25J 9/00
                                                        706/20
9,189,731 B2 * 11/2015  Modha ................... G06N 3/061
(Continued)

FOREIGN PATENT DOCUMENTS

EP      3 293 681 A1      3/2018

OTHER PUBLICATIONS

Guo et al., "Robust Online Time Series Prediction with Recurrent Neural Networks," 2016 IEEE International Conference on Data Science and Advanced Analytics (2016).
(Continued)

*Primary Examiner* — David E Choi
(74) *Attorney, Agent, or Firm* — Finnegan, Henderson, Farabow, Garrett & Dunner, LLP (57) ABSTRACT

This disclosure relates generally to time series forecasting, and, more particularly, to a system and method for online time series forecasting using spiking reservoir. Existing systems do not cater for efficient online time-series analysis and forecasting due to their memory and computation power requirements. System and method of the present disclosure convert a time series value F(t) at time 't' to an encoded multivariate spike train and extracts temporal features from the encoded multivariate spike train by the excitatory neurons of a reservoir, predict a time series value Y(t+k) at time 't' by performing a linear combination of extracted temporal features with read-out weights, compute an error for predicted time series value Y(t+k) with input time series value F(t+k), employs a FORCE learning on read-out weights using the error to reduce error in future forecasting. Feeding a feedback value back to the reservoir to optimize memory of the reservoir.

15 Claims, 8 Drawing Sheets

(56) References Cited

U.S. PATENT DOCUMENTS

| | | | | |
|---|---|---|---|---|
| 9,524,462 | B2* | 12/2016 | Esser | G06N 3/08 |
| 10,496,922 | B1* | 12/2019 | Dockendorf | G06N 3/049 |
| 10,579,925 | B2 | 3/2020 | Kasabov et al. | |
| 2010/0179935 | A1* | 7/2010 | Srinivasa | G06N 3/049 |
| | | | | 706/21 |
| 2015/0269482 | A1* | 9/2015 | Annapureddy | G06N 3/049 |
| 2018/0276530 | A1* | 9/2018 | Paul | G06N 3/08 |
| 2019/0228300 | A1* | 7/2019 | Cao | G06V 10/955 |
| 2019/0318235 | A1* | 10/2019 | Stepp | G06N 3/08 |
| 2021/0232930 | A1* | 7/2021 | Alakuijala | G06N 3/049 |
| 2021/0365778 | A1* | 11/2021 | Dey | G06V 40/20 |
| 2021/0397878 | A1* | 12/2021 | George | G06N 3/047 |
| 2022/0138537 | A1* | 5/2022 | Quanz | G06N 3/048 |
| | | | | 706/21 |
| 2022/0222522 | A1* | 7/2022 | Banerjee | G06N 3/049 |
| 2022/0270751 | A1* | 8/2022 | Bauer | G06N 3/004 |
| 2023/0229911 | A1* | 7/2023 | George | G06N 3/08 |
| | | | | 706/25 |

OTHER PUBLICATIONS

Luo et al., "First Error-Based Supervised Learning Algorithm for Spiking Neural Networks," Networks. Front. Neurosci. 13:559 (2019).

Nicola et al., "Supervised learning in spiking neural networks with FORCE training," Nature Communications, 8:2208 (2017).

Reid et al., "Financial Time Series Prediction Using Spiking Neural Networks," PLoS One, 9(8):e103656 (2014).

Schliebs et al., "Reservoir-based evolving spiking neural network for spatio-temporal pattern recognition," (2011).

Zhang et al., "Spiking Echo State Convolutional Neural Network for Robust Time Series Classification," IEEE Access, 7 (2019).

\* cited by examiner

FIG. 3A performing iteratively, via the one or more hardware processors, at each time instance 't', (i) predicting a value of the time series Y(t+k) at the time instance 't' by performing a linear combination of the plurality of temporal features extracted at time 't' with a plurality of read-out weights at time 't' at an integrate out neuron;

(ii) computing an error E(t+k) for the value of time series Y(t+k) predicted at time instance 't' with time series value F(t+k) as a ground truth, wherein F(t+k) indicates the input time series value at time 't+k';

(iii) employing a FORCE learning on the plurality of read-out weights using E(t+k) to reduce the error in predicting future time series values; and (iv) feeding a feedback value obtained by performing a linear combination of F(t-j) and Y(t+k) to the plurality of excitatory neurons in the reservoir using a second temporal spike encoder at a plurality of feedback neurons to optimize memory of the reservoir, wherein 'F(t-j)' indicates a previous value of the input time series stream F and wherein t >= 1.

SYSTEM AND METHOD FOR ONLINE TIME-SERIES FORECASTING USING SPIKING RESERVOIR

PRIORITY CLAIM

This U.S. patent application claims priority under 35 U.S.C. § 119 to: Indian Patent Application No. 202221002396, filed on Jan. 14, 2022. The entire contents of the aforementioned application are incorporated herein by reference.

TECHNICAL FIELD

The disclosure herein generally relates to time series forecasting, and, more particularly, to a system and method for online time series forecasting using spiking reservoir.

BACKGROUND

Accurate time series forecasting is often required to make a system smart and efficient. Time series forecasting is frequently used in different domains including finance, manufacturing, Internet of Things (IoT), and the like. Different statistical models (for e.g., Autoregressive Integrated Moving Average (ARIMA)) are traditionally used to predict future values by learning and understanding the pattern from older values of a time series. However, the aforementioned statistical models work well for univariate and linear data. But most practical time series data which includes stock market data, IoT sensor data, cosmic radiation data which are non-linear and nonstationary (having a time varying mean and variance) in nature results into concept drift due to the fact that they are often subject to unknown factors and uncertain events.

Neural networks have been found to be a good fit owing to their capability of learning features from non-linear data and adaptability to wide variety of domains. Moreover, both statistical models and neural net models need a lot of data for training and learning. In reality, this requires a lot of working memory to store and analyze the data and a lot of computation power which is a practical bottleneck for edge computing scenarios which involves constrained edge devices such as robots, drones (in general (Automated guided vehicles (AGV)/Unmanned Aerial Vehicles (UAV)), mobile phones etc. Further, in many cases these constrained edge devices are incapable of on-board processing and rely on remote servers thereby increasing the communication cost, thus making the method to be prone to network outages.

Reservoir computing paradigm offers efficient temporal feature extraction from time series using recurrent neural networks with low training cost. One of the existing works has shown the application of reservoirs in prediction of time series. Another existing work describes a double-reservoir based architecture of Echo State Network (ESN) for multi-regime time series—one being used for mapping the sensor measurement to its feature space while the other reservoir is used to analyze the influence of the regime parameter. Some other existing work proved the efficiency of a memristor-based offline reservoir computing hardware system on chaotic timeseries forecasting. Further one more existing work proved capability of Liquid State Machine (LSM), which is a spiking variety of the reservoir, to predict object trajectories from a sensor array input while another existing work took it forward by predicting ball trajectories from input frames of a camera mounted on robot.

However, the aforementioned existing works had the rapidly fading memory problem and did not fit the general time-series forecasting scenario as they were driven by magnitude of input. Later one of the existing works explained an LSM based forecast model that can be implemented in FPGA, which used a probabilistic encoding scheme along with stochastic spiking neurons connected in a recurrent fashion. Here, learning was achieved through linear regression in a batch fashion thus requiring chunk of memory during runtime and the problem of rapidly fading memory persisted here too.

SUMMARY

Embodiments of the present disclosure present technological improvements as solutions to one or more of the above-mentioned technical problems recognized by the inventors in conventional systems. For example, in one embodiment, a method for online time series forecasting using spiking reservoir is provided. The method includes receiving, via one or more hardware processors, a time series value $F(t)$, at a time instance t as an input from a time series stream F; converting, via the one or more hardware processors, the received time series value $F(t)$ to an encoded multivariate spike train using a first temporal spike encoder at a plurality of input neurons; extracting, via the one or more hardware processors, a plurality of temporal features from the encoded multivariate spike train by a plurality of excitatory neurons of a reservoir, wherein the reservoir further comprises of recurrently connected population of a plurality of spiking neurons, and wherein the plurality of spiking neurons comprises of the plurality of excitatory neurons and a plurality of inhibitory neurons; and performing iteratively, via the one or more hardware processors, at each time instance T, (i) predicting a value of the time series $Y(t+k)$ at the time instance 't' by performing a linear combination of the plurality of temporal features extracted at time 't' with a plurality of read-out weights at time 't' at an integrate out neuron; (ii) computing an error $E(t+k)$ for the value of time series $Y(t+k)$ predicted at time instance 't' with time series value $F(t+k)$ as a ground truth, wherein $F(t+k)$ indicates the input time series value at time 't+k'; (iii) employing a FORCE learning on the plurality of read-out weights using $E(t+k)$ to reduce the error in predicting future time series values; and (iv) feeding a feedback value obtained by performing a linear combination of $F(t-j)$ and $Y(t+k)$ to the plurality of excitatory neurons in the reservoir using a second temporal spike encoder at a plurality of feedback neurons to optimize memory of the reservoir, wherein '$F(t-j)$' indicates a previous value of the input time series stream F and wherein $t>=1$.

In another aspect, there is provided a system for online time series forecasting using spiking reservoir. The system comprises: a memory storing instructions; one or more communication interfaces; and one or more hardware processors coupled to the memory via the one or more communication interfaces, wherein the one or more hardware processors are configured by the instructions to: receive a time series value $F(t)$, at a time instance 't' as an input from a time series stream F. The system further comprises converting the received time series value $F(t)$ to an encoded multivariate spike train using a first temporal spike encoder at a plurality of input neurons; extracting a plurality of temporal features from the encoded multivariate spike train by a plurality of excitatory neurons of a reservoir, wherein the reservoir further comprises of recurrently connected population of a plurality of spiking neurons, and wherein the plurality of spiking neurons comprises of the plurality of excitatory neurons and a plurality of inhibitory neurons; and performing iteratively at each time instance 't', (i) predicting a value of the time series Y(t+k) at the time instance 't' by performing a linear combination of the plurality of temporal features extracted at time 't' with a plurality of read-out weights at time 't' at an integrate out neuron; (ii) computing an error E(t+k) for the value of time series Y(t+k) predicted at time instance T with time series value F(t+k) as a ground truth, wherein F(t+k) indicates the input time series value at time 't+k'; (iii) employing a FORCE learning on the plurality of read-out weights using E(t+k) to reduce the error in predicting future time series values; and (iv) feeding a feedback value obtained by performing a linear combination of F(t−j) and Y(t+k) to the plurality of excitatory neurons in the reservoir using a second temporal spike encoder at a plurality of feedback neurons to optimize memory of the reservoir, wherein 'F(t−j)' indicates a previous value of the input time series stream F and wherein t>=1.

In yet another aspect, there are provided one or more non-transitory machine-readable information storage mediums comprising one or more instructions which when executed by one or more hardware processors cause receiving a time series value F(t), at a time instance T as an input from a time series stream F; converting the received time series value F(t) to an encoded multivariate spike train using a first temporal spike encoder at a plurality of input neurons; extracting a plurality of temporal features from the encoded multivariate spike train by a plurality of excitatory neurons of a reservoir, wherein the reservoir further comprises of recurrently connected population of a plurality of spiking neurons, and wherein the plurality of spiking neurons comprises of the plurality of excitatory neurons and a plurality of inhibitory neurons; and performing iteratively at each time instance 't', (i) predicting a value of the time series Y(t+k) at the time instance 't' by performing a linear combination of the plurality of temporal features extracted at time 't' with a plurality of read-out weights at time 't' at an integrate out neuron; (ii) computing an error E(t+k) for the value of time series Y(t+k) predicted at time instance 't' with time series value F(t+k) as a ground truth, wherein F(t+k) indicates the input time series value at time 't+k'; (iii) employing a FORCE learning on the plurality of read-out weights using E(t+k) to reduce the error in predicting future time series values; and (iv) feeding a feedback value obtained by performing a linear combination of F(t−j) and Y(t+k) to the plurality of excitatory neurons in the reservoir using a second temporal spike encoder at a plurality of feedback neurons to optimize memory of the reservoir, wherein 'F(t −j)' indicates a previous value of the input time series stream F and wherein t>=1.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a system and method for online time series forecasting using spiking reservoir. The present disclosure utilizes a temporal spike encoding instead of traditional and widely used rate-based spike encoding schemes. The present disclosure provides feedback enhanced Liquid State Machine (LSM) capable of extracting temporal features of a time-series. A combination of weight initialization and an online learning rule called First Order Reduced and Controlled Error (FORCE) learning (known in the art) which is performed in small time step (for faster learning at an edge device) is used in the present disclosure which helps to deal with concept-drift which plagues time-series forecasting in general.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

Figure 1:
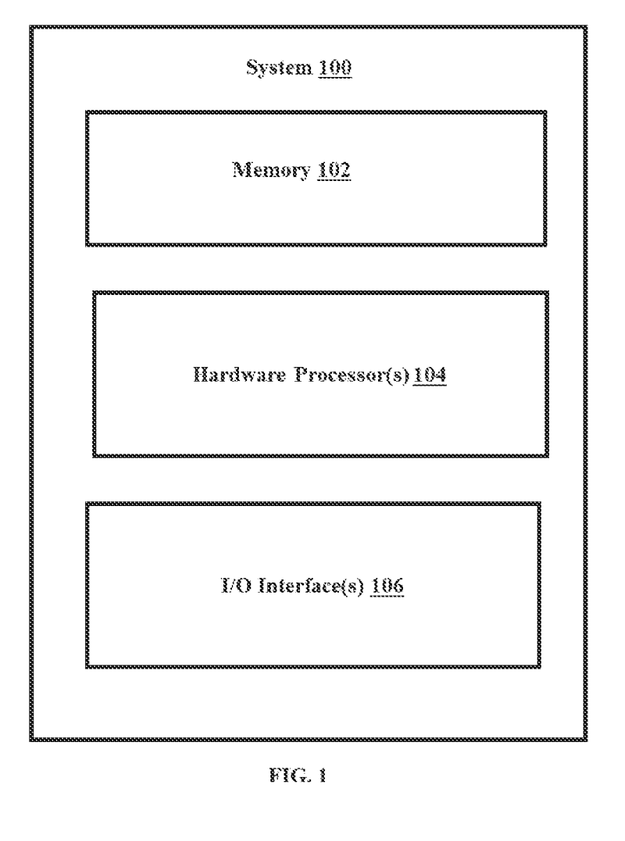
FIG. 1 illustrates an exemplary system for an online time series forecasting using spiking reservoir, according to some embodiments of the present disclosure.

FIG. 1 illustrates an exemplary system 100 for online time series forecasting using spiking reservoir, according to some embodiments of the present disclosure. In an embodiment, the system 100 includes one or more processors 104, communication interface device(s) or input/output (I/O) interface(s) 106, one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 includes one or more data storage devices or memory 102 operatively coupled to the one or more processors 104 and is configured to store instructions configured for execution of steps of the method 300 by the one or more processors 104.

Figure 2:
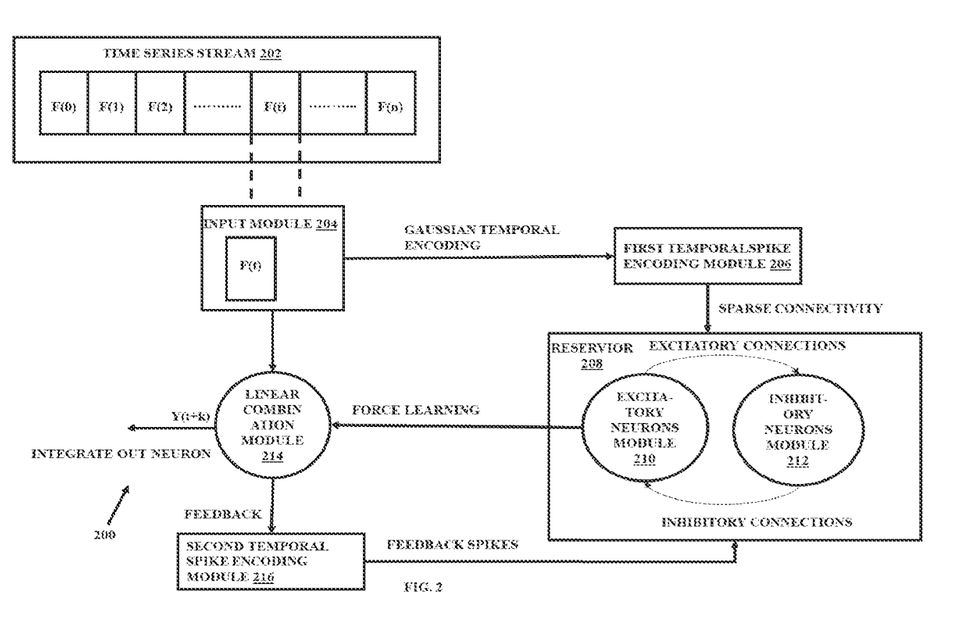
FIG. 2 is a functional block diagram according to some embodiments of the present disclosure.

FIG. 2, with reference to FIG. 1, illustrates a functional block diagram of the system for online time series forecasting using spiking reservoir, according to some embodiments of the present disclosure. In an embodiment, the system 200 includes a time series stream 202, an input module 204, a first temporal spike encoding module 206, a reservoir 208, a linear combination module 214, a second temporal spike encoding module 216. The reservoir 208 further includes an excitatory neurons module 210 and an inhibitory neurons module 212.

Figure 3A:
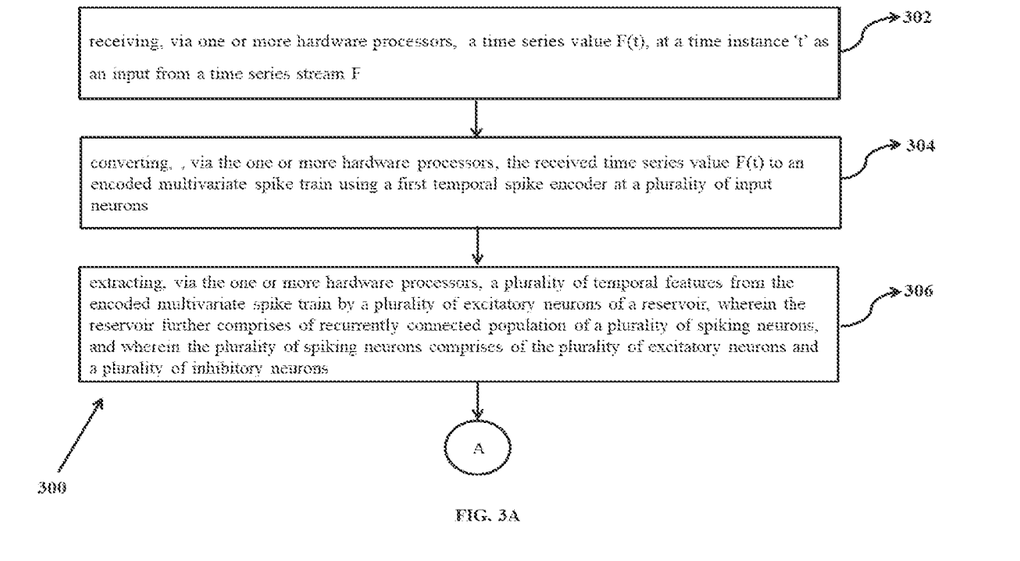
FIGS. 3A and 3B show a flow diagram illustrating the steps involved in a method for online time series forecasting using spiking reservoir according to some embodiments of the present disclosure.
Figure 3B:
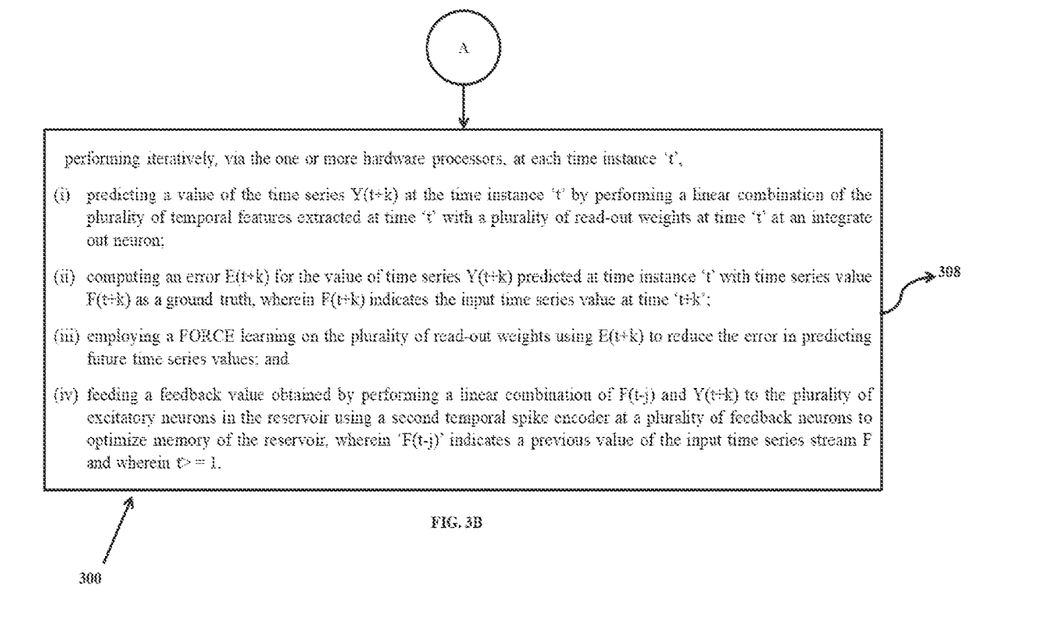

FIGS. 3A and 3B show a flow diagram illustrating the steps involved in a method for online time series forecasting using spiking reservoir according to some embodiments of the present disclosure. Steps of the method of FIG. 3 shall be described in conjunction with the components of FIG. 2. At step 302 of the method 300, the one or more hardware processors 104, receive a time series value F(t), at a time instance 't' as an input from a time series stream F. Referring to FIG. 2, the input module 204 receives the time series F(t) at 't' time from the time series stream 202. The time series values (F(t)) can be any real valued number within any range, wherein time variable 't' can have values ranging from zero to any positive integer. For example, 0<=t<+ infinity. i.e., only positive integers. At step 304 of the method 300, the one or more hardware processors 104, convert the received time series value F(t) to an encoded multivariate spike train using a first temporal spike encoder at a plurality of input neurons. Herein, the plurality of input neurons refers to the spiking neurons comprised in a plurality of excitatory neurons of a reservoir. The Spiking Neural Networks (SNN) work with a philosophy which is different from traditional artificial neural networks (ANN). The neurons in the SNN mimic the models of actual biological spiking neurons which emit "spikes" after reception of any external stimuli. Thus, depending on the value of the external stimuli, the information is carried through by one or more spikes. The present disclosure uses Leaky Integrate and Fire (LIF) model. The membrane potential V of a neuron, at any point in time is mathematically modelled through Equation 1:

$$\tau_{mem}\frac{dV}{dt} = (V_{rest} - V) + g_e(E_{exc} - V) + g_i(E_{inh} - V) \quad (1)$$

The membrane potential tends to evolve towards the resting potential, $V_{rest}$. Without any input stimuli, membrane potential remains at $V_{rest}$. Synapses between two consecutive neurons can be excitatory or inhibitory in nature, whose equilibrium potentials are represented by $E_{exc}$ and $E_{inh}$ respectively. Functionality of excitatory or inhibitory synapses are represented via conductance $g_e$ and $g_i$ respectively. When a pre-synaptic neuron spikes, the conductance of the synapse increases in magnitude. Excitatory pre-synaptic neurons contribute towards increasing membrane potential whereas inhibitory pre-synaptic neurons contribute towards decreasing it. The membrane potential upon crossing a threshold value, $V_{thresh}$, emits a spike, Information is processed between neurons through synapses via these asynchronous time events called spikes. The dynamics of excitatory and inhibitory conductance is described by Eqn. 2.

$$\tau_e\frac{dg_e}{dt} = -g_e \text{ and } \tau_i\frac{dg_i}{dt} = -g_i \quad (2)$$

The pre-synaptic trace $x_{pre}$ and the post-synaptic trace $x_{post}$, the representative of the activity of the pre-synaptic neuron and the post-synaptic neuron respectively decay exponentially with time as shown in the Eqn. 3 with synaptic trace decay constants $\tau_{pre}$ and $\tau_{post}$. When a spike occurs at a pre or post-synaptic neuron, its trace value is increased in magnitude by a constant value of I.

$$\tau_{pre}\frac{dx_{pre}}{dt} = -x_{pre} \text{ and } \tau_{post}\frac{dx_{post}}{dt} = -x_{post} \quad (3)$$

For efficient functionality of SNN, it is very important that the captured external stimuli are properly encoded, preferably in a way such that most of the information content of the data is retained in an encoded spike train and then fed into the network. For spiking reservoir computers like liquid state machines, a temporal scheme will help much more in feature extraction. The present disclosure uses a Gaussian based temporal encoding scheme to convert the received time series F(t) to an encoded multivariate spike train which is depicted by the first temporal spike encoding module 206 of FIG. 2.

Let y(t) be variable denoting the time series value at 't'. Also let $y_{min}$ and $y_{max}$ be the theoretical upper and lower bounds on that variable y(t), then 'm' neurons can be used for generating the receptive fields between the range $y_{min}$, $y_{max}$. For $i^{th}$ encoding neuron (ranging from 1 to m), center of the receptive field is aligned with a Gaussian centered at $$\mu_{i=y_{min}+(i-1)\frac{(y_{max}-y_{min})}{m-2}} \quad (4)$$

with a deviation of $$\sigma = \beta\frac{(y_{max}-y_{min})}{(m-2)} \quad (5)$$

where β is a scaling term used for controlling the width of the distribution. This essentially divides the entire input space into 'm' overlapping spatial regions, each attuned to an encoding neuron whose P(firing a spike) is given by the gaussian. For each value of y(t), the value of y(t), can be projected onto these gaussians to get all individual probabilities P(ith neuron spikingly(t)).

Further these individual probabilities need to be distributed over to the temporal domain, say between [t1, t2]. For this purpose, one can assume any probabilistic distribution but for simplicity, it is assumed that the probability of spiking is uniformly distributed between [t1, t2]. Thus entire [t1, t2] range is divided into 'm' individual time-steps of length $$\frac{(t2 - t1)}{m}$$

and P(spiking at $j^{th}$ timestep for $i^{th}$ neuron) now depends on how far the given P($i^{th}$ neuron spikingly(t)) is with respect to P($i^{th}$ neurons mean). If P($i^{th}$ neuron spikingly(t)) is very high and near to mean of the $i^{th}$ gaussian, then ideally there should not be any delay for $i^{th}$ neuron to fire. It should spike in the first time-step itself, similarly as P($i^{th}$ neuron spikingly(t)) moves away from max probability P($i^{th}$ neurons mean), it's delay and time-step of firing should increase. As such probability range [$P_{thresh}$, P ($i^{th}$ neurons mean)] is divided into 'm' probability thresholds such that the $i^{th}$ neuron spikes at a time where P ($i^{th}$ neuron spikingly(t)) can cross the associated max threshold. In this manner, each value of y(t) expanded and encoded into 'm' different spike trains generated by encoding neurons, each of length 'm' time-steps. $P_{thresh}$ is an encoding hyperparameter which determines the boundary probability of spiking and non-spiking for an individual neuron.

At step 306 of the method 300, the one or more hardware processors 104, extract a plurality of temporal features from the encoded multivariate spike train by a plurality of excitatory neurons of a reservoir, wherein the reservoir further comprises of recurrently connected population of a plurality of spiking neurons, and wherein the plurality of spiking neurons comprises of the plurality of excitatory neurons and a plurality of inhibitory neurons. In an embodiment of the present disclosure, the encoded multivariate spike train is fed into the reservoir 208, which is a recurrently connected population of spiking neurons, also known as Liquid State Machines (LSM). The present disclosure uses a dual-population reservoir, wherein one population is composed of the plurality of excitatory neurons which is depicted by the excitatory neurons module 210 and other is composed of the plurality of inhibitory neurons which is depicted by the inhibitory neurons module 212. Input population is connected exclusively to the plurality of excitatory neurons via a set of sparse input connection as shown in FIG. 2. Here, the input population means the input encoding neurons that encodes the input time series into corresponding multivariate spike trains. In an embodiment of the present disclosure, the terms "excitatory neurons" and "excitatory population" can be interchangeable used. Herein, the terms "inhibitory neurons" and "inhibitory population" can be interchangeable used. The excitatory population extracts the temporal features present in the encoded multivariate spike train and further activates the inhibitory population via another set of connections thus forming a self-regulatory mechanism capable of extracting better temporal embeddings. Herein, the terms "temporal features" and "temporal embeddings" can be interchangeable used. The separation of populations and connections help to efficiently fine tune the spiking behavior of the reservoir 208 by using a plurality of spiking neural network parameters like excitatory out-degree, inhibitory out-degree and the like. The recurrent connections within each of the plurality of excitatory population and each of the inhibitory population is very sparse and contain variable length cycles in them. This helps in projecting the input encoded multivariate spike trains to a higher-dimensional space where hidden temporal features get reflected on the activity of each reservoir neuron. The extracted temporal embedding is in the form of the spike train of reservoir neurons. In an embodiment of the present disclosure, the excitatory and the inhibitory population sizes were 6000 and 4800 respectively. It is to be noted that such sizes of the excitatory and the inhibitory population shall not be construed as the limiting scope of the present disclosure.

At step 308 of the method 300, the one or more hardware processors 104, perform iteratively at each time instance 't', (i) predicting a value of the time series Y(t+k) at the time instance 't' by performing a linear combination of the plurality of temporal features extracted at time 't' with a plurality of read-out weights at time 't' at an integrate out neuron which is depicted by the linear combination module 214 of FIG. 2;

(ii) computing an error E(t+k) for the value of time series Y(t+k) predicted at time instance 't' with time series value F(t+k) as a ground truth, wherein F(t+k) indicates the input time series value at time 't+k';

(iii) employing a FORCE learning on the plurality of read-out weights using E(t+k) to reduce the error in predicting future time series values; and (iv) feeding a feedback value obtained by performing a linear combination of F(t−j) and Y(t+k) to the plurality of excitatory neurons in the reservoir using a second temporal spike encoder at a plurality of feedback neurons to optimize memory of the reservoir, wherein 'F(t−j)' indicates a previous value of the input time series stream F and wherein t>=1 which is depicted by the linear combination module 214 and second temporal spike encoding module 216 of FIG. 2.

Figure 4A:
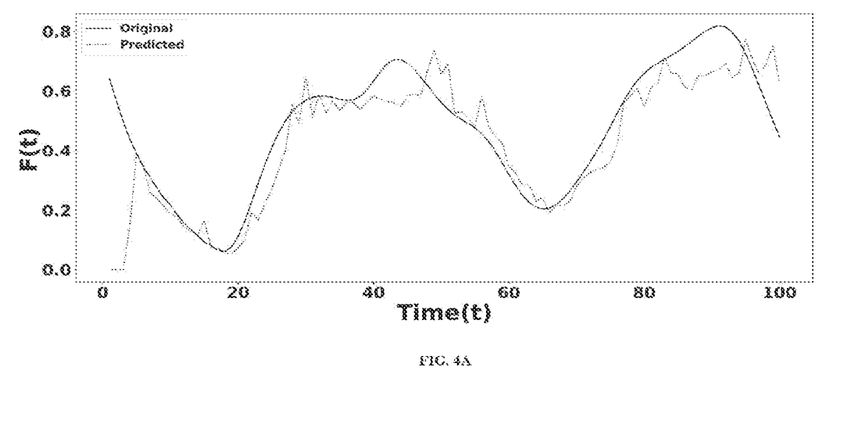
FIGS. 4A and 4B show a use case example illustrating an original and predicted output of Mackey Glass Series (MGS) time series and spike encoded MGS timeseries respectively according to some embodiments of the present disclosure.
Figure 4B:
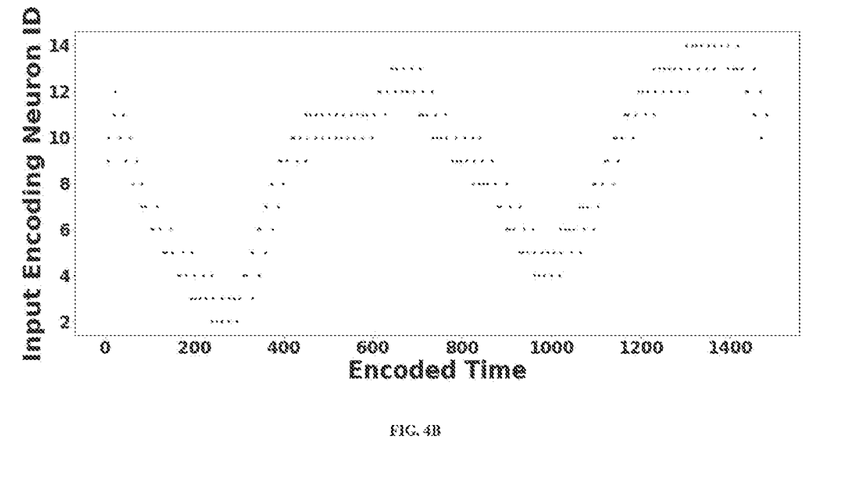

FIGS. 4A and 4B show a use case example illustrating an original and predicted output of Mackey Glass Series (MGS) time series and spike encoded MGS timeseries respectively according to some embodiments of the present disclosure. The precision of the encoding is dependent on the number of encoding neurons which is also a tunable hyperparameter. In the present disclosure, 15 input encoding neurons have been used resulting in 15× magnification of the input timescale to spike time scale. FIG. 4A depicts unencoded MGS time series (an example of the input F(t)) for initial 100 timesteps. FIG. 4B depicts the corresponding encoded spike train (using 15 input encoding neurons). The post-encoding time scale magnification, as described above, is depicted in FIGS. 4A and 4B.

In an embodiment of the present disclosure, once the temporal embeddings are obtained from the reservoir 208, a set of learnable synapses called readout weights are modified such that the temporal embeddings produce the required supervised output i.e., the predicted or forecasted time series value. The output neuron produces a forecast for current time step as per Eqn. 10 (which is explained below in the later sections).

The reservoirs are inherently plagued by rapidly fading memory problem and as such cannot learn long-term temporal filters. Moreover, if the magnitude of the input reduces, the activity and thus the output of spiking networks (including reservoirs) gradually die out. The present disclosure uses a feedback loop to the plurality of excitatory neurons of the reservoir 208 as shown in FIG. 2, to solve fading memory problem. Multiple signals can be used as feedback to the reservoir 208. Further, error between the predicted and desired output i.e., the predicted or forecasted time series value could be a good candidate, but if this error is large then it can drive the reservoir 208 to go into the chaotic regime. The present disclosure uses a combination of—(i) Teacher Forcing strategy (known in the art) (ii) output bounding weight initialization, and (iii) error controlling FORCE learning (known in the art). This also solves the dying out problem for continuous prediction.

a) Teacher Forcing: A linear combination of previous timestep's desired values (for e.g., F(t−1), F(t−2) . . . for timestep=t) and predicted value (e.g., Y(t+k) are fed back to the reservoir 208 for forecasting the value F(t) for current time step. Like the input and recurrent connections, the feedback synapses are sparse and static. The feedback values are encoded by an integrate neuron using the same a second temporal spike encoder 216 which uses a Gaussian based temporal encoding scheme but at a different instance as that of the Gaussian based temporal encoding scheme used at a first temporal spike encoder 206.

b) Output bounding weight initialization: In an embodiment of the present disclosure, the plurality of readout weights is initialized from a uniform distribution whose upper and lower bounds are given by the Eqn. 6.

$$\min(W_{out})*E[x_{trace}]*num_{exc} \geq \min((F(t)))$$

$$\max(W_{out})*E[x_{trace}]*num_{exc} \leq \max((F(t))) \quad (6)$$

where $W_{out}$ is the readout weight matrix, $E[x_{trace}]$ is the expected value of the spike trace variables associated with each neuron and $num_{exc}$ is the number of neurons in the plurality of excitatory population of the reservoir. This ensures that even if the reservoir goes into chaotic regime in initial steps, the maximum error generated remains bounded. Expected value of the spike trace is a dataset dependent value and as such cannot be known in advance in an online scenario. Instead, the maximum value of the spike trace is bounded to a practical finite value and approximate the expected value to it. This is justified because in a worst-case scenario, where every neuron in the reservoir spikes, maximum activity will be pushed into the output neuron and this will be clamped at a practical limit. The readout weights are sampled as shown in Eqn. 7.

$$W_{out} \sim U(w_{min}, w_{max}), \text{ where} \quad (7)$$

$$w_{max} \geq \frac{\min(F(t))}{\max\_limit(x_{trace})}*num_{exc}$$

c) FORCE Learning: FORCE learning is generally carried out using rate-based neurons for generating any desired dynamics from a population of neurons. The present disclosure approximates the rate of a spiking neuron with the help of spike traces to track its activity. These traces are dynamic states which increases by a step size of I whenever the corresponding neuron spikes (as shown in Eqn. 8).

$$\tau_{trace}\frac{dx_{trace}[i]}{dt} = -x_{trace}[i] \quad (8)$$

$$x_{trace}[i](t) = x_{trace}[i](t-1) + I, S[i] = 1$$

$$x_{trace}[i](t-1) + I, S[i] = 0$$

Here $x_{trace}[i]$ represents the $i^{th}$ neuronal spike trace, $\tau_{trace}$ is a time constant which controls the exponential decay of the trace and S is the instantaneous spike vector of the reservoir. Also, these traces are exponentially decayed with time, giving priority to recent spike influences while retaining long term trends and patterns. Usually, adaptive filter learning rules like Recursive Least Squares (RLS) are used in FORCE learning and can be applied on $x_{trace}(i)$ for generating the desired output i.e., the predicted or forecasted time series value. In Recursive Least Squares (RLS), the system 100 recursively estimates an inverse of the correlation matrix of the trace values with a regularization factor of η. Let this matrix be P(t). At each time-step, this matrix is updated by $x_{trace}(i)$ as shown in Eqn. 9.

$$P(0) = \frac{I}{\eta}P(t) = P(t-1) - \frac{P(t-1)x_{trace}(t)x_{trace}^T(t)P(t-1)}{1+x_{trace}^T(t)P(t-1)x_{trace}(t)} \quad (9)$$

The output integrate neuron uses the learned weights to decode the reservoir embeddings (i.e., the temporal embeddings) and produce a forecast for current time step as per Equation 10 (here k=1).

$$Y(t) = W_{out}^T(t-1)x_{trace}(t-1) \quad (10)$$

When the ground-truth for the previous time-step reaches the output integrate node, the integrate out neuron calculates the error and updates the $W_{out}$ as shown in Eqn. 11.

$$E(t)=F(t)-Y(t)$$

$$W_{out}(t)=W_{out}(t-1)-E(t)P(t)x_{trace}(t) \quad (11)$$

Since the FORCE learning ensures small prediction error, it is ideal for dealing with online learning scenarios where input data distribution often changes (known as concept drift). It is a major issue in all time-series forecasting methods. In case, if the FORCE learning is used for an online learning scenario, then the initial errors can accumulate over time to throw the reservoir into uncontrollable chaotic mode and output would deviate by a huge margin thus taking forever to converge.

While the method of the present disclosure tries to forecast F(0) at t=0, the initial weights (i.e., all weights inside the Spiking reservoir networks, including the readout weights. Weights are typically associated with every synaptic connection between a pair of neurons) and feedback are random. Therefore, initial prediction error is high but later as the method of the present disclosure receives ground-truth information, the weights may be updated based on the error as per FORCE learning rule. This reduces the error and as the online learning proceeds, the error subsides and converges around zero. The method can be extended for prediction windows of any arbitrary size.

The prediction performance of the present disclosure is tested by using 9 timeseries datasets which is explained in the below sections. First one is well known Mackey Glass Series (MGS) which is a chaotic, non-linear time series generated by the delay differential equation 12:

$$\tau \frac{dx}{dt} = \beta x(t) + \alpha \frac{x(t-\tau)}{\left(1 + x(t-\tau)^{10}\right)} \quad (12)$$

Many biological process dynamics can be modelled using Equation (12). By varying the value of scale constants ($\alpha, \beta$) and time delay ($\tau$), different Mackey Glass Series (MGS) time series can be obtained. Here $\alpha=2$, $\beta=-1$ and $\tau=2$ is considered. The datasets namely Car Registration and Dow Jones Industrial Average are synthetically created and are taken from "Online arima algorithms for time series prediction", link: https://ojs.aaai.org/index.php/AAAI/article/View/10257, whereas Intel Lab Sensor datasets consisting of temperature and humidity data as collected by Mica2Dot sensors is taken from "Intel Lab Data humidity, temperate sensor data," link: http://http://db.csail.mit.edu/labdata/lab-data.html. These datasets cover various types of time series encountered at edge scenario and these types are explained below:

1) Type 1: Stationary time series data generated by an Autoregressive Integrated Moving Average (ARIMA) model (known in the art) whose Auto-regressive coefficients ($\alpha$) are set to $[0.6, -0.5, 0.4, -0.4, 0.3]^T$, Moving Average coefficients ($\beta$) set to $[0.3, -0.2]^T$, with a difference value, d=1. The noise terms are normally distributed, from $N(0, 0.3^2)$. Type 2: Non-Stationary time series data generated by an ARIMA model whose first half of values are generated using $\alpha=[0.6, -0.5, 0.4, -0.4, 0.3]^T$, $\beta=[0.3, -0.2]^T$, d=1, and second half values using $\alpha=[-0.4, -0.5, 0.4, 0.4, 0.1]^T$, $\beta[-0.3, 0.2]^T$, d=1. The noise terms are uniformly distributed from U(-0.5, 0.5).

2) Type 3: Non-Stationary time series data generated by an ARIMA model with the same coefficients as above ($\alpha=[0.6, -0.5, 0.4, -0.4, 0.3]^T$, $\beta=[-0.3, -0.2]^T$), but now by changing the difference value parameter. For each one-third of data, d is set as d=2, then d=1, followed by d=0 respectively. 4) Type 4: Non-Stationary time series generated by an Autoregressive Integrated Moving Average (ARIMA) model with $\beta$ values set to $[0.32, -0.2]^T$ and with dynamically changing $\alpha$ values as given by Eqn. 13.

$$\alpha(t) = [-0.4, 0.5, 0.4, 0.4, 0.1]^T \cdot \frac{t}{10^4} + \quad (13)$$
$$[0.6, -0.4, 0.4, -0.5, 0.4]^T \cdot \left(1 - \frac{t}{10^4}\right)$$

Performance comparison between various models on different datasets were conducted using Coefficient of Determination or $R^2$ Score (wherein R denotes residuals). The performance comparison is a metric used to measure the goodness of regression models. It quantifies the amount of variance in the error of predicted value that remains unexplained with respect to the amount of variance in the input data. $R^2$ Score is not a scale dependent metric, and as such performance of forecasting is compared between datasets.

Also, it is unitless and can be used as an accuracy measure for regression tasks. $R^2$ Score ranges from -infinity to 1.0, with 1.0 representing the model forecasting all the values correctly, accounting for all the variability in input data. Score of zero represents that the model is able to (or) predict (or predicts) the mean of the data without accounting for any variability.

$$R^2 = 1 - \frac{SS_{res}}{SS_{res}} \quad (14)$$

where $SS_{res}$ is the residual sum of squares and $SS_{tot}$ is the total sum of squares representing the variance of the original signal, defined as Eqn. 15.

$$SS_{res} = -\sum_i (pred_i - \text{true}_i)^2 \text{ and} \quad (15)$$
$$SS_{tot} = -\sum_i (\text{true}_i - \text{mean}(\text{true}))^2$$

Another metric Root Means Square Error (RMSE) is used for measuring error between actual and predicted values by the system of the present disclosure. It is the square root of the mean value of all the squared residuals (Eqn. 16), and it is always positive.

$$RMSE = \sqrt{\frac{\sum_{i=1}^{N} (pred_i - \text{true}_i)^2}{N}} \quad (16)$$

RMSE is a scale dependent metric, therefore it can only be used for comparing different models on same dataset and not for comparison between datasets.

Figure 5:
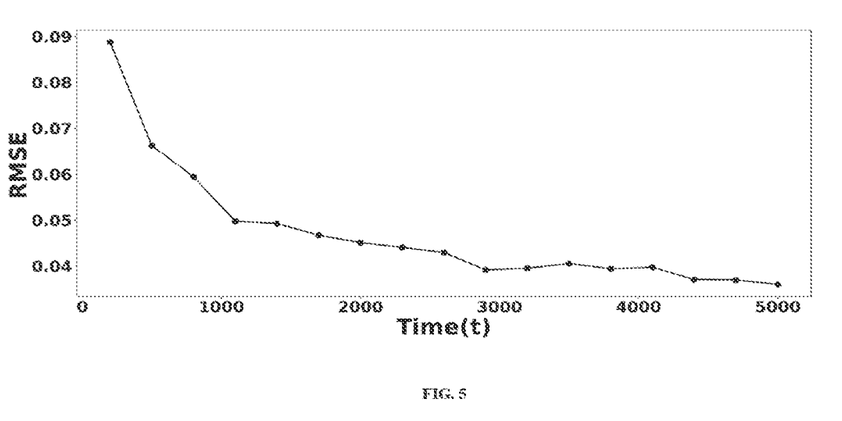
FIG. 5 illustrates a Root Mean Square Error (RMSE) trend over time during prediction of MGS in accordance with some embodiments of the present disclosure.

FIG. 5 illustrates a Root Mean Square Error (RMSE) trend over time during prediction of MGS in accordance with some embodiments of the present disclosure. The feasibility of the present prediction approach on the non-linear, is validated on chaotic Mackey Glass (MGS) dataset. The dotted curve in FIG. 4A depicts the predicted values for MGS (first 100 timesteps) as done by the present method. Corresponding RMSE value is shown in FIG. 5. It is observed that the error reduces as online learning progresses and correctly approximates the time-series with residual converging to zero.

TABLE I

Performance comparison between the method of the present disclosure and SARIMA (as known in the art model) for various prediction windows (on MGS data)

| Prediction Window Length | $R^2$ Score | |
|---|---|---|
| | SARIMA | Method of the present disclosure |
| 1 | 0.99912 | 0.98086 |
| 2 | 0.96093 | 0.95392 |
| 3 | 0.97973 | 0.90881 |
| 4 | 0.87672 | 0.79220 |
| 5 | 0.84752 | 0.75584 |

The method of the present disclosure was then benchmarked against statistical Seasonal Autoregressive Integrated Moving Average (SARIMA) model (known in the art) for prediction window lengths $\in \{1, 2, 3, 4, 5\}$.

SARIMA (known in the art) is an offline model and was trained incrementally but it stored all the data points till current time step. It was observed that the method of the present disclosure gave comparable predictions to that of the SARIMA model without needing to store any data points. Coefficient of Determination ($R^2$ Score) was calculated for predictions done by both SARIMA and the present approach (refer Table I—for small prediction window sizes (<3), $R^2$ score of method of the present disclosure is within 1% of that obtained by SARIMA. For higher prediction window sizes, this margin increases with maximum deviation being 9%. This behavior is expected as SARIMA has direct access to all the previous information which helps it in making good predictions for larger windows while the present online approach works best in the nearby vicinity of the last trained data point.

TABLE II

Performance comparison of the method of the present disclosure with Online ARIMA and Stacked Long short-term memory (LSTM) on synthetic time series datasets

| | $R^2$ Score | | |
|---|---|---|---|
| Time Series Dataset | Online ARIMA | Stacked LSTM | Method of the present disclosure |
| Stationary without distribution change/drift | 0.99692 | 0.93594 | 0.98403 |
| Stationary, Chaotic generator, without drift | 0.98679 | 0.90117 | 0.98086 |
| Non-Stationary, drift by generating process change | 0.98917 | 0.97637 | 0.98463 |
| Non-Stationary, drift by over and under differencing | 0.97870 | 0.99240 | 0.99745 |
| Non-Stationary, drift by dynamic process change with time | 0.96599 | 0.87265 | 0.97660 |

TABLE III

Performance comparison of the method of the present disclosure with Online ARIMA and Stacked Long short-term memory (LSTM) on various real-life time series datasets

| | $R^2$ Score | | |
|---|---|---|---|
| Time Series Dataset | Online ARIMA | Stacked LSTM | Method of the present disclosure |
| Car Registration | 0.471 | 0.511 | 0.601 |
| Dow Jones Industrial Average | 0.972 | 0.993 | 0.996 |
| Intel Lab Humidity Sensor | 0.786 | 0.907 | 0.979 |
| Intel Lab Temperature Sensor | 0.907 | 0.939 | 0.981 |

Experiment with 9 datasets are conducted, wherein first one is well known Mackey Glass Series (MGS) which is a chaotic, non-linear time series. This includes non-linear, non-stationary and data with concept drift induced in various ways. Online Autoregressive Integrated Moving Average (ARIMA) implementation along with datasets were available publicly and a stacked Long short-term memory (LSTM) network of 3 layers and 1000 hidden units was implemented for benchmarking. Detailed comparison of these three models in terms of $R^2$ Score is shown in Table II, In the first three scenarios, $R^2$ score of the present model is within 1% of the Online ARIMA accuracy and for the next two, the present method outperforms it. The Long short-term memory (LSTM) does not perform well on stationary datasets but it produces comparable accuracy to that of Online ARIMA in scenarios 3 and 4. High accuracy for Online ARIMA (>95%) on these datasets can be attributed to the fact that even though the scenarios are diverse, the underlying process which is generating the data is an ARIMA process under Markovian assumptions. This makes it relatively easier for Online ARIMA to model the time series and forecast for future. Compared to Online ARIMA, LSTM model, the method of the present disclosure doesn't benefit from that advantage. In all these experiments the present model outperforms the Stacked LSTM model by around 5% on average without needing to store any of the data points.

Figure 6:
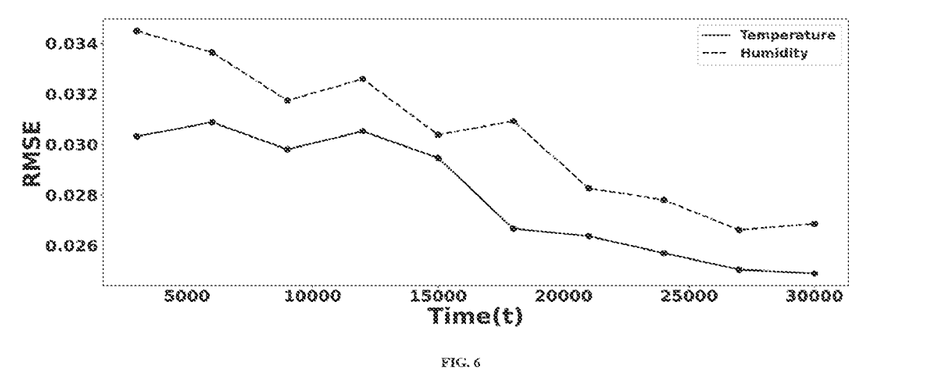
FIG. 6 illustrates a Root Mean Square Error (RMSE) trend during the prediction of a real-world dataset (temperature and humidity sensor data) in accordance with some embodiments of the present disclosure.

FIG. 6 illustrates a Root Mean Square Error (RMSE) trend during the prediction of a real-world dataset (temperature and humidity sensor data) in accordance with some embodiments of the present disclosure. Further the method of the present disclosure is benchmarked on four real-life datasets from various domains as mentioned above. All of these real-world datasets are non-linear and non-stationary, with car registration dataset being very difficult to forecast due to its random oscillatory nature. For this reason, the Online ARIMA model underperformed compared to both LSTM and the method of the present disclosure. $R^2$ score of the method of the present disclosure is higher than both LSTM and Online ARIMA by at least 10% on average (refer Table III). It is to be noted that all three models struggle to get a decent $R^2$ score for Car Registration dataset while the method of the present disclosure has achieved 60% compared to LSTM's 51% and Online ARIMA's 47%. Reduction of RMSE values over time for real world, Intel Lab Temperature and Humidity datasets are shown in FIG. 6. As shown, the initial error itself is small due to FORCE learning. Some occasional peaks in RMSE occur due to concept drift but is followed by a reduction in RMSE (as the online model learns the new distribution).

TABLE IV

Comparing estimated energy consumption, number of parameters and updates, memory requirement

| Model | Estimated energy consumption (kJ) | $R^2$ Score | No. of trainable parameters | No. of parameter updates | Extra memory used (in datapoints) |
|---|---|---|---|---|---|
| SARIMA | 267.87 | 0.99912 | 16 | 4.81e+6 | 6200 |
| Stacked LSTM | 200.22 | 0.90117 | 8.248e+5 | 1.962e+12 | 6200 |
| Method of the present disclosure | 2.3722e−7 | 0.98086 | 6000 | 3.72e+7 | 0 |

Finally, the present online prediction method (also referred as method of the present disclosure) is benchmarked against offline models (SARIMA and Stacked LSTM) in terms of (i) number of trainable parameters, (ii) total number of parameter updates needed during the training, (iii) approximate power consumption and (iv) memory requirements (refer Table IV). Number of parameters and updates would be same as the number of neurons in the plurality of excitatory population of the reservoir in case of the present model as readout synaptic weights only get modified. Being an online model, the present method is supposed to do weight updates whenever the data arrives. LSTM has significantly higher number of parameters and has to iterate through data for multiple epochs, thus making number of updates to be very high. The number of parameters is very low along with number of updates for SARIMA but the cost of each update is much higher than FORCE based RLS learning rule as implemented by the method of the present disclosure. This is because at each step, it has to fit the SARIMA model on the entirety of the data seen so far. Both LSTM and SARIMA needs 200 kJ computational power for MGS dataset. The power estimates for LSTM and SARIMA is calculated by measuring Intel Running Average Power Limit (RAPL), which gives an average estimate of energy consumption on the entire CPU socket and using Nvidia Management Library for Graphics Processing Unit (GPU) power consumption. The power consumption of the present spiking model was estimated indirectly by considering the total number of synaptic operations (SOP) along with the energy consumption figure per Synaptic Operation (SOP) provided by Intel Loihi (known in the art). The SNN model promises considerable reduction in power consumption—to the order of 10-5 times that of conventional hardware. On the storage memory side, the offline models has to store all the datapoints and iterate through them multiple times which required the offline models to keep a buffer same as the dataset size. The size is observed to be 6200 datapoints for MGS dataset but this grows linearly with the number of datapoints. On the other hand, the method and system 100 of the present disclosure do not need to keep a buffer for storing data since the learning is completely online. This way, the present approach saves 100% on the storage space.

The spiking network is implemented using BindsNet v0.2.7 (known in art). Hyperparameter search was conducted on validation data using a Grid Search methodology. The major parameters tuned include various connectivity parameters like excitatory population's out-degree, input encoder's out-degree and various scaling parameters like input weight scaler, excitatory weight scaler and the like. All the experiments were run on an Nvidia DGX Server with a V100 GPU having 32 GB as its VRAM. In case of randomized algorithms, an initial seed value of zero is used before sampling. SARIMA and Stacked LSTM models were implemented in Python for benchmarking purposes. SARIMAX implementation of pmdARIMA(v1.7.1) library was used for this purpose. The parameter tuning of SARIMAX model was done using auto-ARIMA functionality provided by podARIMA. Stacked LSTM model was implemented on PyTorch (v1.2.0) with 3 hidden layers and 1000 hidden units. The network was then running 40 epochs on each dataset. The parameter tuning was conducted here also, using Grid Search. The stationarity of all the datasets was checked using Augumented Dickey-Fuller Test (ADF Test).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The present disclosure provides a system and method for online time series forecasting using spiking reservoir. The embodiment of present disclosure herein addresses unresolved problem of avoiding rapidly fading memory problem while time series forecasting. The present disclosure uses the FORCE learning to reduce the error in future forecasting of time series, thus the present disclosure being an online-learning solution doesn't require to store data at the edge device and is capable of lifelong learning. Moreover, the embodiments herein further provide continuous feedback to the reservoir to improve the memory of the reservoir.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, via one or more hardware processors, a time series value F(t), at a time instance 't' as an input from a time series stream F;
   converting, via the one or more hardware processors, the received time series value F(t) to an encoded multivariate spike train using a first temporal spike encoder at a plurality of input neurons;
   extracting, via the one or more hardware processors, a plurality of temporal features from the encoded multivariate spike train by a plurality of excitatory neurons of a reservoir, wherein the reservoir further comprises of recurrently connected population of a plurality of spiking neurons, and wherein the plurality of spiking neurons comprises of the plurality of excitatory neurons and a plurality of inhibitory neurons; and
   performing iteratively, via the one or more hardware processors, at each time instance 't',
   (i) predicting a value of the time series Y(t+k) at the time instance 't' by performing a linear combination of the plurality of temporal features extracted at time 't' with a plurality of read-out weights at time 't' at an integrate out neuron;
   (ii) computing an error E(t+k) for the value of time series Y(t+k) predicted at time instance 't' with time series value F(t+k) as a ground truth, wherein F(t+k) indicates the input time series value at time 't+k';
   (iii) employing a FORCE learning on the plurality of read-out weights using E(t+k) to reduce the error in predicting future time series values; and
   (iv) feeding a feedback value obtained by performing a linear combination of F(t−j) and Y(t+k) to the plurality of excitatory neurons in the reservoir using a second temporal spike encoder at a plurality of feedback neurons to optimize memory of the reservoir, wherein 'F(t−j)' indicates a previous value of the input time series stream F and wherein t>=1.

2. The processor implemented method of claim 1, wherein the extraction of the plurality of extracted temporal features is based on an activation of the plurality of excitatory neurons controlled by the plurality of inhibitory neurons of the reservoir.

3. The processor implemented method of claim 1, wherein the integrate out neuron is a logical neuron that performs linear combination of the plurality of temporal features extracted at time instance 't' with a plurality of read-out weights at the time instance 't' to predict the time series value Y(t+k) at the time instance 't'.

4. The processor implemented method of claim 1, wherein the plurality of read-out weights is a plurality of connections from the plurality of excitatory population of the plurality of spiking neurons comprised in the reservoir to the integrate out neuron.

5. The processor implemented method of claim 1, wherein the plurality of feedback neurons of the second temporal spike encoder is used to encode the feedback value into a multivariate spike train.

6. A system, comprising:
   a memory storing instructions;
   one or more communication interfaces; and
   one or more hardware processors coupled to the memory via the one or more communication interfaces, wherein the one or more hardware processors are configured by the instructions to:
   receive a time series value F(t), at a time instance 't' as an input from a time series stream F;
   convert the received time series value F(t) to an encoded multivariate spike train using a first temporal spike encoder at a plurality of input neurons;
   extract a plurality of temporal features from the encoded multivariate spike train by a plurality of excitatory neurons of a reservoir, wherein the reservoir further comprises of recurrently connected population of a plurality of spiking neurons, and wherein the plurality of spiking neurons comprises of a plurality of excitatory neurons and a plurality of inhibitory neurons; and
   perform iteratively at each time instance 't',
   (i) predict a value of the time series Y(t+k) at the time instance 't' by performing a linear combination of the plurality of temporal features extracted at time 't' with a plurality of read-out weights at time t at an integrate out neuron;
   (ii) compute an error E(t+k) for the value of time series Y(t+k) predicted at time instance 't' with time series value F(t+k) as a ground truth, wherein F(t+k) indicates the input time series value at time 't+k';
   (iii) employ a FORCE learning on the plurality of read-out weights using E(t+k) to reduce the error in predicting future time series values; and
   (v) feed a feedback value obtained by performing a linear combination of F(t−j) and Y(t+k) to the plurality of excitatory neurons in the reservoir using a second temporal spike encoder at a plurality of feedback neurons to optimize memory of the reservoir, wherein 'F(t−j)' indicates a previous value of the input time series stream F and wherein t>=1.

7. The system of claim 6, wherein the extraction of the plurality of extracted temporal features is based on an activation of the plurality of excitatory neurons controlled by the plurality of inhibitory neurons of the reservoir.

8. The system of claim 6, wherein the integrate out neuron is a logical neuron that performs linear combination of the plurality of temporal features extracted at time instance 't' with a plurality of read-out weights at the time instance 't' to predict the time series value Y(t+k) at the time instance 't'.

9. The system of claim 6, wherein the plurality of read-out weights is a plurality of connections from the plurality of excitatory population of the plurality of spiking neurons comprised in the reservoir to the integrate out neuron.

10. The system of claim 6, wherein the plurality of feedback neurons of the second temporal spike encoder is used to encode the feedback value into a multivariate spike train.

11. One or more non-transitory machine-readable information storage mediums comprising one or more instructions which when executed by one or more hardware processors cause:
receiving, a time series value F(t), at a time instance 't' as an input from a time series stream F;
converting, the received time series value F(t) to an encoded multivariate spike train using a first temporal spike encoder at a plurality of input neurons;
extracting, a plurality of temporal features from the encoded multivariate spike train by a plurality of excitatory neurons of a reservoir, wherein the reservoir further comprises of recurrently connected population of a plurality of spiking neurons, and wherein the plurality of spiking neurons comprises of the plurality of excitatory neurons and a plurality of inhibitory neurons; and
performing iteratively, at each time instance 't',
(i) predicting a value of the time series Y(t+k) at the time instance 't' by performing a linear combination of the plurality of temporal features extracted at time 't' with a plurality of read-out weights at time 't' at an integrate out neuron;
(ii) computing an error E(t+k) for the value of time series Y(t+k) predicted at time instance 't' with time series value F(t+k) as a ground truth, wherein F(t+k) indicates the input time series value at time 't+k';
(iii) employing a FORCE learning on the plurality of read-out weights using E(t+k) to reduce the error in predicting future time series values; and
(iv) feeding a feedback value obtained by performing a linear combination of F(t−j) and Y(t+k) to the plurality of excitatory neurons in the reservoir using a second temporal spike encoder at a plurality of feedback neurons to optimize memory of the reservoir, wherein 'F(t−j)' indicates a previous value of the input time series stream F and wherein t>=1.

12. The one or more non-transitory machine-readable information storage mediums of claim 11, wherein the extraction of the plurality of extracted temporal features is based on an activation of the plurality of excitatory neurons controlled by the plurality of inhibitory neurons of the reservoir.

13. The one or more non-transitory machine-readable information storage mediums of claim 11, wherein the integrate out neuron is a logical neuron that performs linear combination of the plurality of temporal features extracted at time instance 't' with a plurality of read-out weights at the time instance 't' to predict the time series value Y(t+k) at the time instance 't'.

14. The one or more non-transitory machine-readable information storage mediums of claim 11, wherein the plurality of read-out weights is a plurality of connections from the plurality of excitatory population of the plurality of spiking neurons comprised in the reservoir to the integrate out neuron.

15. The one or more non-transitory machine-readable information storage mediums of claim 11, wherein the plurality of feedback neurons of the second temporal spike encoder is used to encode the feedback value into a multivariate spike train.

* * * * *